United States Patent [19]

Shimizu et al.

[11] Patent Number: 6,064,324
[45] Date of Patent: May 16, 2000

[54] DIGITAL SIGNAL ENCODING AND DECODING METHOD AND APPARATUS WITHOUT TRANSMITTING INFORMATION ON QUANTIZATION WIDTH

[75] Inventors: Atsushi Shimizu; Kazuto Kamikura; Hiroshi Watanabe; Atsushi Sagata, all of Tokyo, Japan

[73] Assignee: Nippon Telegraph and Telephone Corporation, Tokyo, Japan

[21] Appl. No.: 09/097,774

[22] Filed: Jun. 16, 1998

[30] Foreign Application Priority Data

Jun. 18, 1997 [JP] Japan ................... 9-161152

[51] Int. Cl.⁷ .................. H03M 7/00; H03M 7/40
[52] U.S. Cl. ................................ 341/50; 341/67
[58] Field of Search ................. 341/50, 67, 200; 348/405, 406, 699; 382/248

[56] References Cited

U.S. PATENT DOCUMENTS

| 4,772,946 | 9/1988 | Hammner | 348/406 |
| 5,706,009 | 1/1998 | Kondo et al. | 341/200 |
| 5,831,688 | 11/1998 | Yamada et al. | 348/699 |

FOREIGN PATENT DOCUMENTS

| 54-2050 | 1/1979 | Japan . |
| 4-341083 | 11/1992 | Japan . |
| 6-291680 | 10/1994 | Japan . |
| 6-296272 | 10/1994 | Japan . |
| 8-65683 | 3/1996 | Japan . |

OTHER PUBLICATIONS

"Information Technology—Coding of Moving Pictures and Associated Audio for Digital Storage Media at Up to about 1.5 Mbits/s," International Standard, ISO/IEC 11172–2, Chapter 2.4.2, 1993.

*Primary Examiner*—Brian Young
*Assistant Examiner*—Patrick Wamsley
*Attorney, Agent, or Firm*—Pennie & Edmonds LLP

[57] ABSTRACT

Digital signal encoding and decoding method and apparatus are provided, by which the amount of codes for communicating the quantization width can be reduced to the utmost and the coding efficiency can be improved. In the method, at the time of encoding a digital signal, the quantization width is determined based on the amount of encoded data which have already been encoded, and information on the quantization width is not included into generated encoded data. At the time of decoding, the quantization width is determined according to the amount of encoded data which have already been received. Therefore, even if the quantization width is changed, information on the quantization width is not included in the generated encoded data and thus the amount of generated codes can be reduced.

14 Claims, 6 Drawing Sheets

DIGITAL SIGNAL ENCODING AND DECODING METHOD AND APPARATUS WITHOUT TRANSMITTING INFORMATION ON QUANTIZATION WIDTH

BACKGROUND OF THE INVENTION

1. Field of the Invention

The present invention relates to digital signal encoding and decoding methods, apparatuses for executing these methods, and storage media storing relevant executing programs.

This application is based on Patent Application No. Hei 9-161152 filed in Japan, the contents of which are incorporated herein by reference.

2. Description of the Related Art

In the coding of digital signals, the amount of generated codes is controlled by adjusting the width for quantization (i.e., quantization width, or the number of quantization steps). If the amount of actually generated codes is larger than a target amount of codes, then the amount of generated codes is depressed by increasing the quantization width. On the other hand, if the amount of actually generated codes is smaller than a target amount of codes, then the amount of generated codes is increased by narrowing the quantization width.

According to each objective for coding of digital signals, various units may be used for changing the quantization width. For example, in the method "ISO/IEC 11172-2 (MPEG-1)" of coding moving pictures, the quantization width can be determined for each small block of 16×16 pixels. If the quantization width is changed for each specific unit and information of the quantization width is transmitted for each unit, then the amount of codes necessary for transmitting the information becomes large and thus efficiency of coding is lowered. Therefore, more desirable methods are known such that (i) information of the quantization width is transmitted only when the width is actually changed; and (ii) a difference between the quantization width of a signal to be encoded next and the quantization width of an already-encoded signal is transmitted.

As another method for depressing the amount of codes for transmission of the quantization width, the variable range of the quantization width may be restricted so as to shorten the length of codes which indicate the quantization width. According to this method, the amount of codes necessary for transmitting the quantization width can be depressed and simultaneously the quantization width can be changed.

In the above conventional techniques, information indicating the quantization width must be transmitted every time the quantization width is changed, and increase of the amount of codes according to this transmission is inevitable.

In addition, the variable range of the quantization width is restricted; thus, even if the quantization width is maximized within the range, the amount of generated codes may not approach the target amount of codes.

SUMMARY OF THE INVENTION

An object of the present invention is to provide a digital signal encoding method and apparatus for improving the coding efficiency by reducing the amount of codes for communicating the quantization width to the utmost, and to provide a decoding method and apparatus for performing decoding operations corresponding to the encoding operations performed by the above encoding method and apparatus.

Another object of the present invention is to provide a digital signal encoding method and apparatus for expanding a controllable range of the amount of generated codes relating to the quantization width by relieving restrictions with respect to the quantization width, and to provide a decoding method and apparatus for performing decoding operations corresponding to the encoding operations performed by the above encoding method and apparatus.

In order to realize the above objects, the present invention provides a digital signal encoding and decoding method wherein:

the encoding side comprises the steps of: dividing a digital signal into small blocks; calculating a quantization width for each small block based on an amount of encoded data which have already been encoded; quantizing the small-blocked digital signal, obtained by the division into small blocks, by using the calculated quantization width; and generating encoded data according to a quantized index which is a digital signal after the quantization, and the decoding side comprises the steps of: decoding the quantized index according to received encoded data; calculating a quantization width for each small block based on an amount of encoded data which have already been received; inversely quantizing the quantized index for each small block, which is a digital signal after the decoding, by using the calculated quantization width; and regenerating a digital signal by combining the divided small blocks.

According to the present invention, at the time of encoding a digital signal, the quantization width is determined based on the amount of encoded data which have already been encoded, and information on the quantization width is not included into generated encoded data. At the time of decoding the encoded data, the quantization width is determined according to the amount of encoded data which have already been received. Therefore, even if the quantization width is changed, information on the quantization width is not included in the generated encoded data and thus the amount of generated codes can be reduced.

In the above method, there may be no guarantee that the amount of already-received encoded data (i.e., information on the received codes) equals the amount of already-encoded data which was used for calculating the quantization width at the time of encoding (i.e., information on the generated codes), due to information loss during transmission. Therefore, if information loss may occur during transmission, then information which was used for calculating the quantization width is included into the generated encoded data at predetermined intervals. At the time of decoding the encoded data, the information which was used for calculating the quantization width and which is included at predetermined intervals is extracted from the encoded data. Based on the extracted information, the quantization width can be accurately calculated even if information loss during data transmission is possible.

The present invention also provides an encoding method relating to the encoding portion of the above method, and a decoding method relating to the decoding portion of the above method.

The present invention further provides apparatuses for executing these methods, that is:

(1) a digital signal encoding apparatus comprising: a small block division section for dividing a digital signal into small blocks; a quantization width calculating section for calculating a quantization width for each small block based on an amount of encoded data which have already been encoded; a quantizer for quantizing the small-blocked digital signal, obtained by the division into small blocks, by using the calculated quantization width; and an encoded data generating section for generating encoded data according to a quantized index which is a digital signal after the quantization, and (2) a digital signal decoding apparatus comprising: a decoding section for decoding a quantized index according to received encoded data; a quantization width calculating section for calculating a quantization width for each small block based on an amount of encoded data which have already been received; an inverse quantizer for inversely quantizing the quantized index for each small block, which is a digital signal after the decoding, by using the calculated quantization width; and a small block combining section for regenerating a digital signal by combining divided small blocks.

The present invention also provides storage media storing programs for executing the above methods.

According to the above methods and apparatuses, the amount of codes for transmitting the quantization width can be reduced, and thus the coding efficiency can be improved. It is also possible to relieve restrictions with respect to the quantization width, and thereby the possible control range of quantization can be enlarged.

DESCRIPTION OF THE PREFERRED EMBODIMENTS

Hereinbelow, an embodiment according to the present invention will be explained with reference to the drawings.

In the present embodiment, an example of encoding and decoding digital picture signals is explained.

Figure 1:
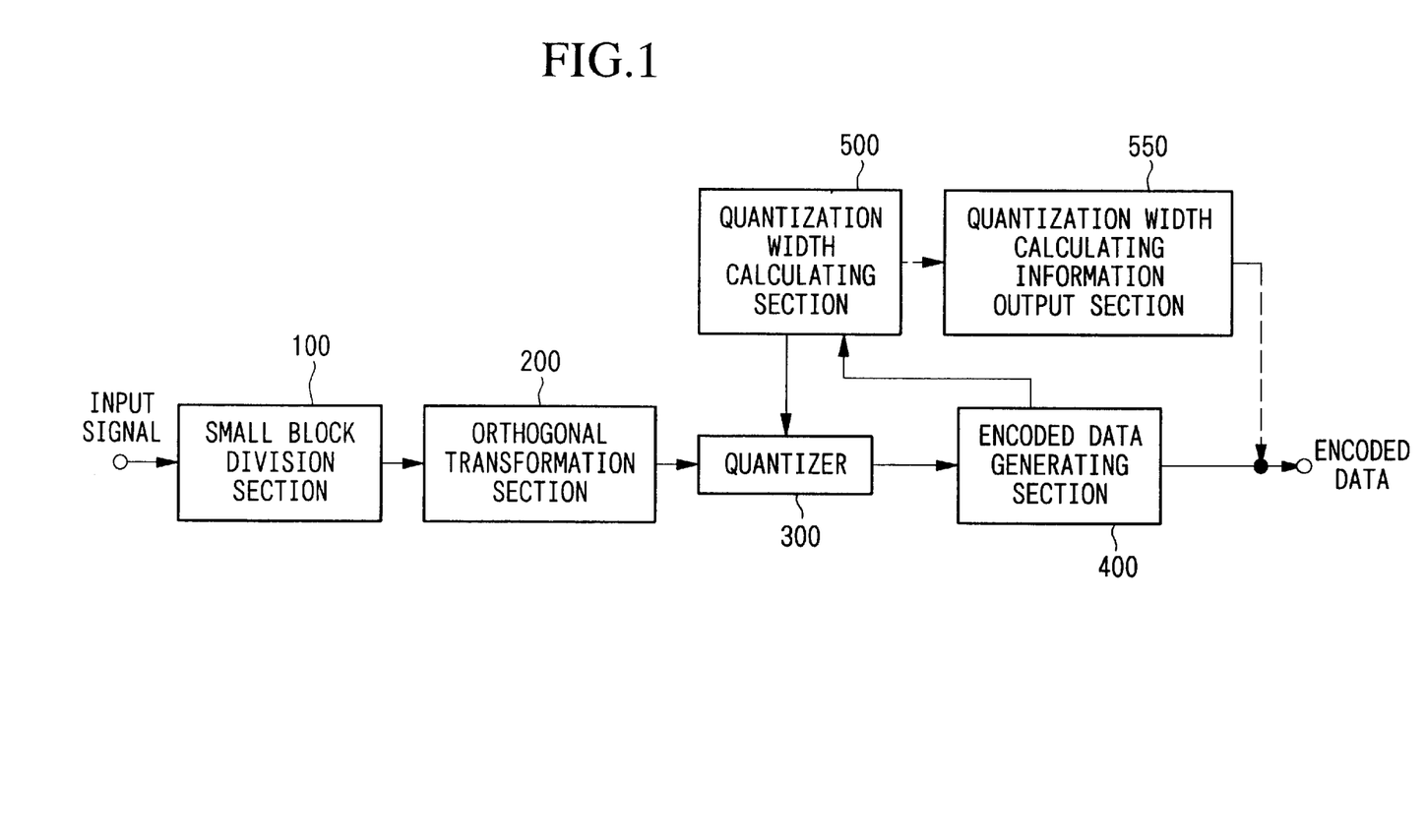
FIG. 1 is a block diagram showing the construction of the digital signal encoding apparatus as an embodiment according to the present invention.
Figure 5:
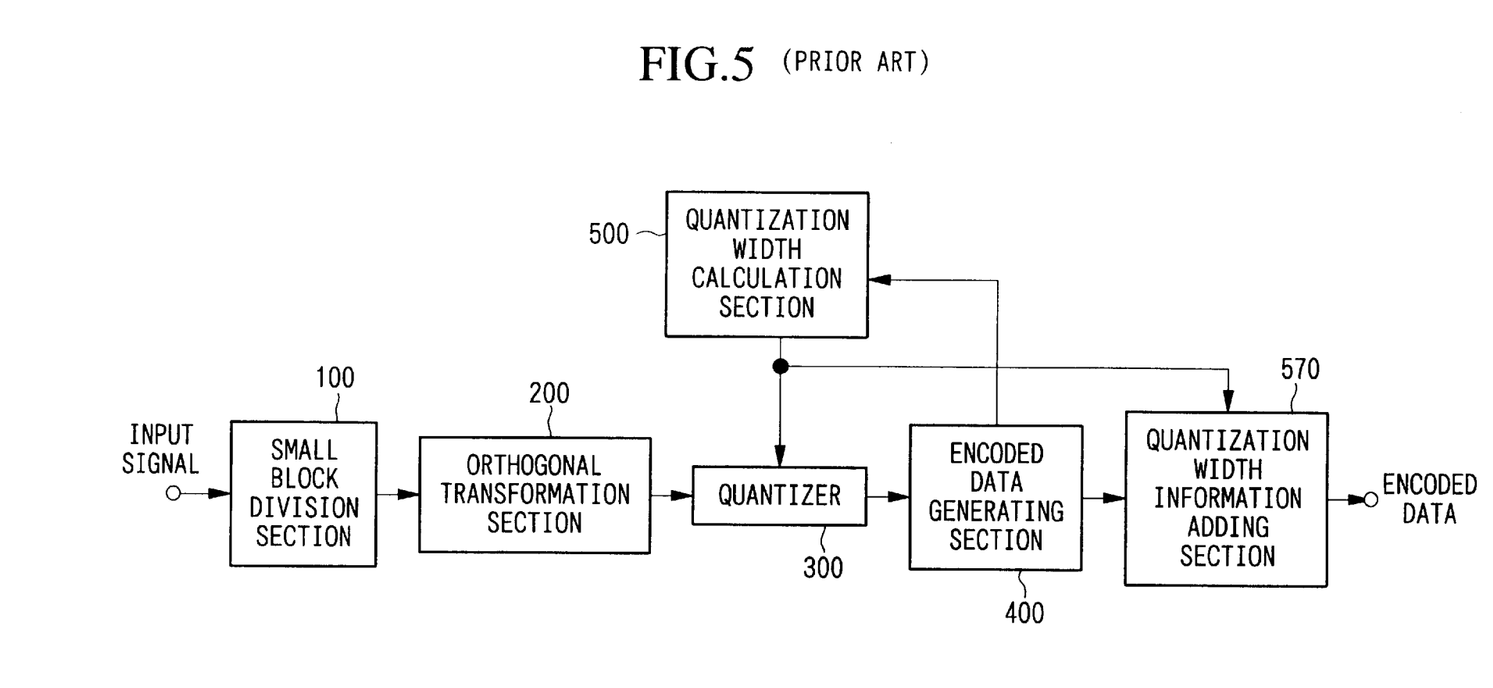
FIG. 5 is a block diagram showing an example of the conventional digital signal encoding apparatus.

FIG. 1 is a block diagram showing an example of the encoding apparatus. The algorithm used for coding is based on orthogonal transformation performed with respect to a unit of a small block, and in the algorithm, a coefficient relating to the orthogonal transformation is quantized and the quantized index is encoded. That is, in the present embodiment, a signal is divided into small blocks, and the quantization width can be changed for each small block. FIG. 5 shows an example of the conventional encoding apparatus in comparison with the corresponding apparatus of the present embodiment.

In the figures, an input digital picture signal is divided into small blocks in small block division section 100, and orthogonal transformation is performed for each small block in orthogonal transformation section 200. A coefficient of the orthogonal transformation (i.e., a result of the orthogonal transformation) is quantized in quantizer 300 using a quantization width output from quantization width calculating section 500. The quantized index as a result of the quantization is encoded in encoded data generating section 400, and encoded data is output and transmitted. The encoded data generating section 400 communicates information on the amount of the generated encoded data (i.e., the amount of generated codes) to the quantization width calculating section 500, and the calculating section 500 calculates the relevant quantization width based on the communicated information. The above is the basic flow of the operations.

On the other hand, in the conventional apparatus as shown in FIG. 5, information on the quantization width (output from the quantization width calculating section 500) is added to encoded data (output from the encoded data generating section 400) in quantization width information adding section 570, and a result of the above addition is output and transmitted as encoded data.

Here, it is specified that the size of each small block is M×N, the size of the picture frame is H×V, the number of small blocks in the picture frame is K, and the target amount of (generated) codes of the picture frame is $T_f$. The target amount $T_f$ of codes of the picture frame is added to the head of a relevant sequence of the encoded data. Additionally, in consideration of influence due to information loss which may occur when the quantization width is calculated at the decoding side, total amount $G_t$ of generated codes with respect to H/M (units of) small blocks is transmitted for each time when the H/M small blocks have been processed.

Figure 3:
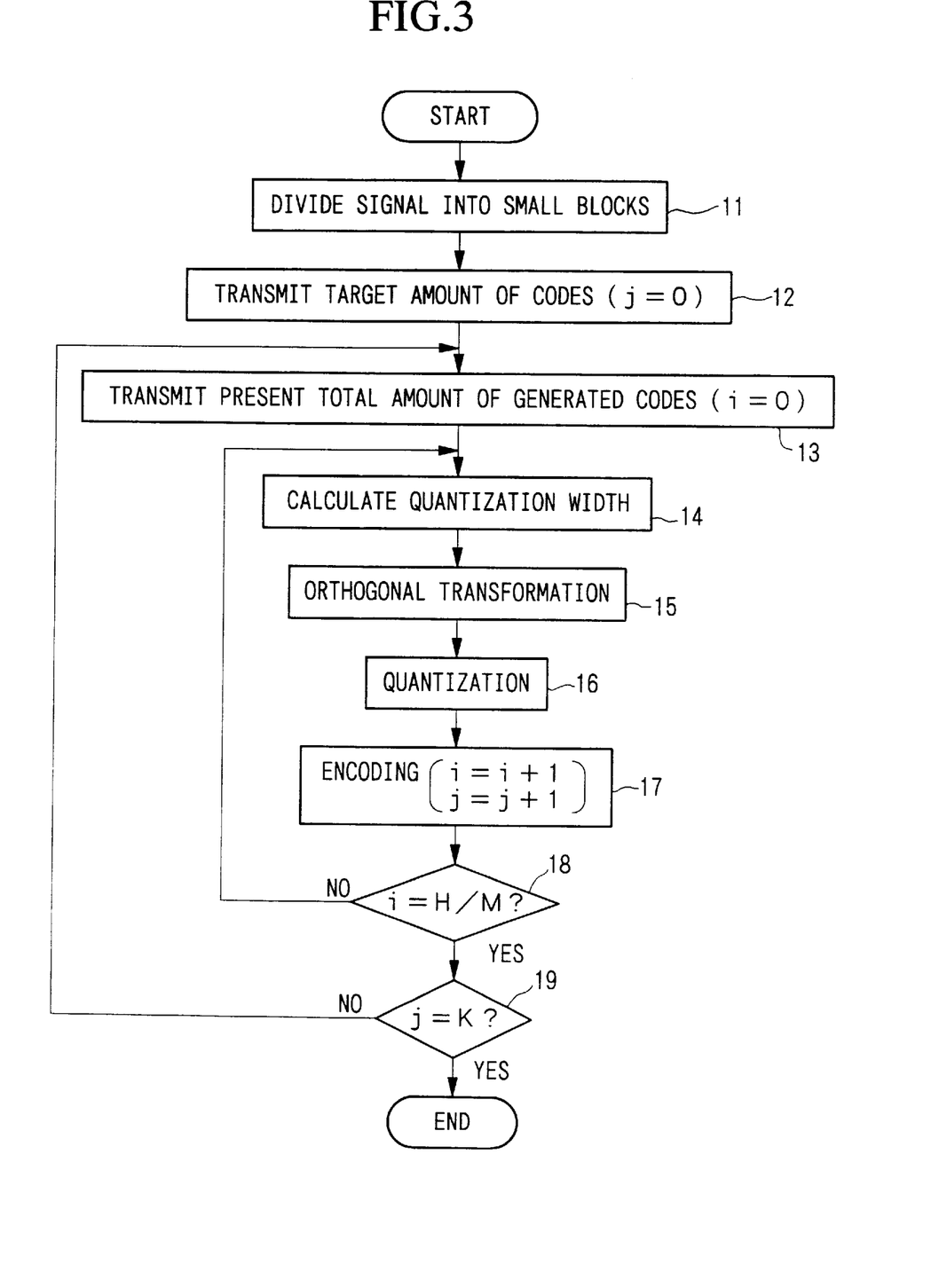
FIG. 3 is a flowchart showing the procedure of the encoding method as an embodiment according to the present invention.

FIG. 3 is a flowchart showing the procedure of the encoding method of the present embodiment.

1. The picture signal is divided into small blocks (step 11).
2. The target amount $T_f$ of codes is transmitted (step 12).
3. The total amount $G_t$ of generated codes at the present time ($G_t$ is information which was used for calculating the quantization width) is transmitted (step 13). This information is output from quantization width calculating information output section 550 so as to perform stable decoding even if data loss may occur during transmission, and the information is thus not indispensable.
4. The quantization width $Q_k$ of a target small block to be encoded is calculated (step 14).
5. The orthogonal transformation is performed on the target small block to be encoded (step 15).
6. The coefficient of the orthogonal transformation performed on the target small block is quantized using quantization width $Q_k$ (step 16).
7. The quantized index of each coefficient of the orthogonal transformation is encoded (step 17).
8. Operations of the above items 4–7 are repeatedly performed until H/M units of small blocks have been encoded (step 18).
9. Operations of the above items 3–8 are repeatedly performed until all small blocks in the target frame to be encoded have been encoded (step 19). That is, the above total amount $G_t$ of generated codes is transmitted for every H/M units of small blocks.

As explained above, in the present embodiment, information relating to the quantization width is not included in the encoded data.

Operations of calculating the quantization width in the encoding method of the present embodiment will be explained below.

Here, a total amount of codes relating to information other than that of the small blocks (that is, information added to the head of the sequence of encoded data, or information sent for every H/M small blocks) is $G_{oh}$.

In the present embodiment, an assigned target amount $T_k$ of generated codes of the kth small block is defined as follows.

$$T_k = \frac{T_f - G_{oh} - \sum_{i=0}^{k-1} G_i}{K - k} \quad (1)$$

Here, $G_i$ (i=0, 1, 2, ..., k-1) indicates the amount of generated codes of the ith small block. The assigned target amount $T_0$ of generated codes of the first small block to be encoded is defined as follows.

$$T_o = \frac{T_f - G_{oh}}{K} \quad (2)$$

The quantization width $Q_k$ of the small block to be encoded is determined based on the assigned target amount $T_k$ of generated codes of the small block to be encoded, according to the following formula.

$$Q_k = \frac{a \cdot (T_f - G_{oh})}{T_k \cdot K} \quad (3)$$

Here, "a" is a predetermined constant which is a positive real number.

Figure 2:
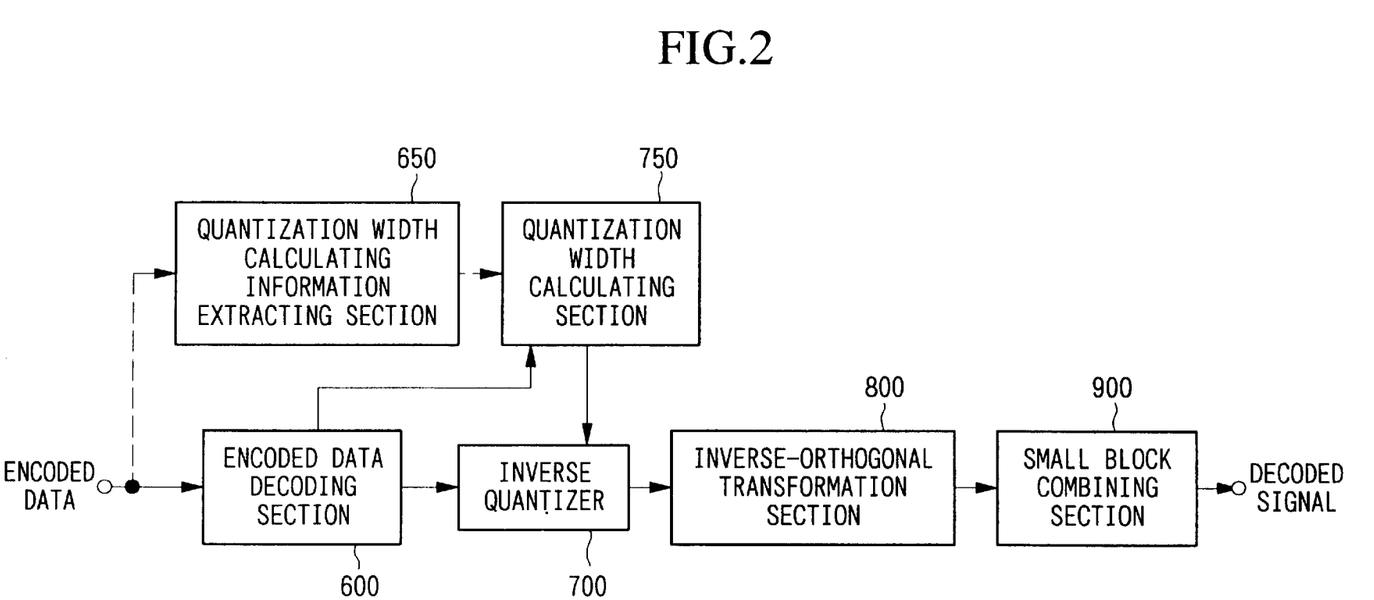
FIG. 2 is a block diagram showing the construction of the digital signal decoding apparatus as an embodiment according to the present invention.
Figure 6:
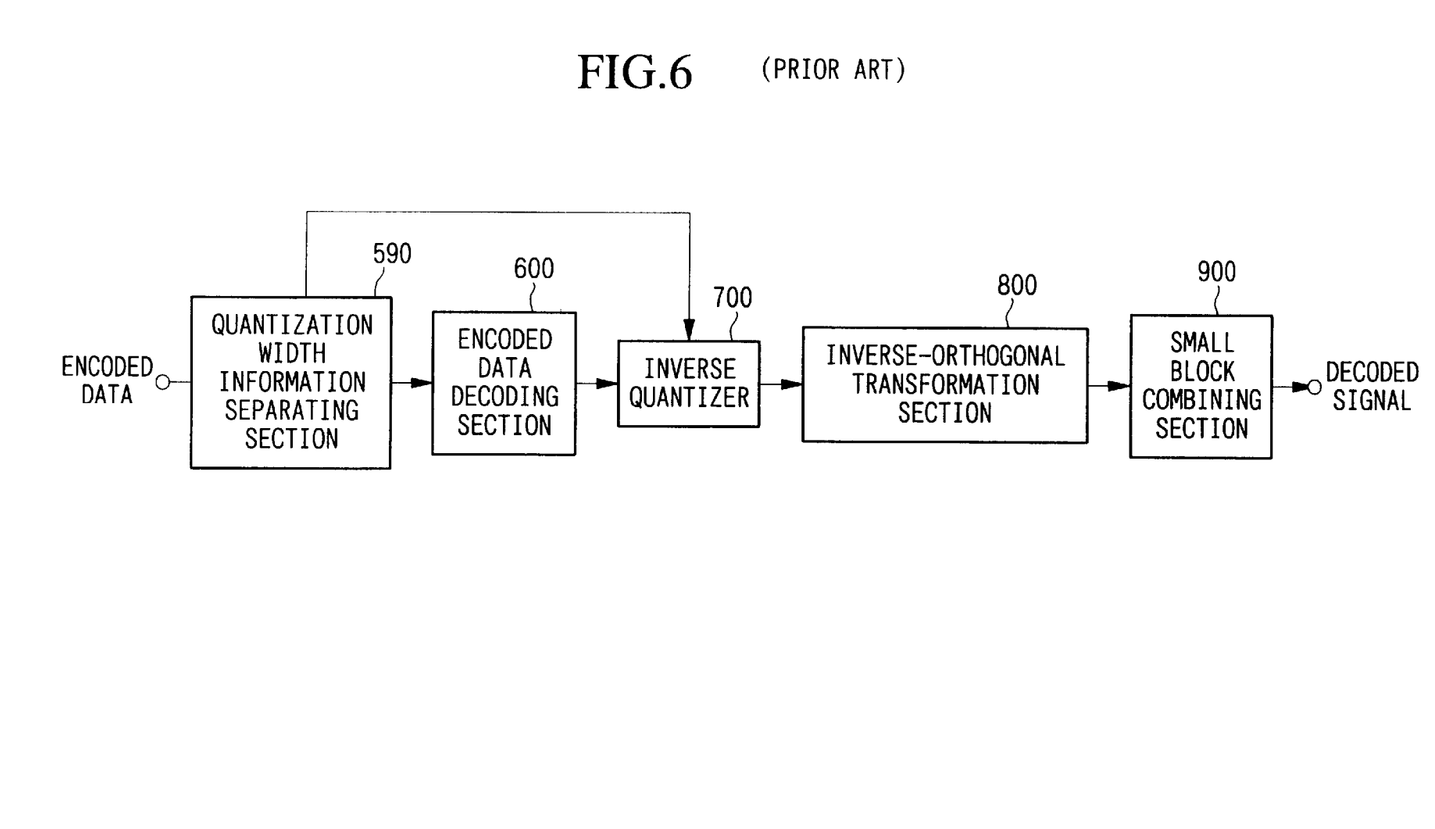
FIG. 6 is a block diagram showing an example of the conventional digital signal decoding apparatus.

Next, FIG. 2 is a block diagram showing an example of the decoding apparatus for decoding data encoded by the above-explained encoding apparatus. FIG. 6 shows an example of the conventional decoding apparatus in comparison with the corresponding apparatus of the present embodiment.

In FIG. 2, received encoded data is decoded in encoded data decoding section 600, and is further inverse-quantized and inverse-orthogonal transformed via inverse quantizer 700 and inverse-orthogonal transformation section 800. In the above operations, the encoded data decoding section 600 outputs received information about the amount of codes to quantization width calculating section 750, and the calculating section 750 outputs information about the quantization width so as to supply the information to the inverse quantizer 700. The data after the inverse-quantizing operation is restored by small block combining section 900 to original data, that is, data before they were divided into small blocks. The restored data is output as a decoded digital signal. The above is the basic flow of the operations.

On the other hand, in the conventional apparatus as shown in FIG. 6, the information on the quantization width, which was added at the time of encoding, must be separated. Therefore, the received encoded data is first input into quantization width information separating section 590 so that the received data is separated into the original encoded data portion and the information on the quantization width. The encoded data after the separation is input into the encoded data decoding section 600, while the information on the quantization width is input into the inverse quantizer 700.

Figure 4:
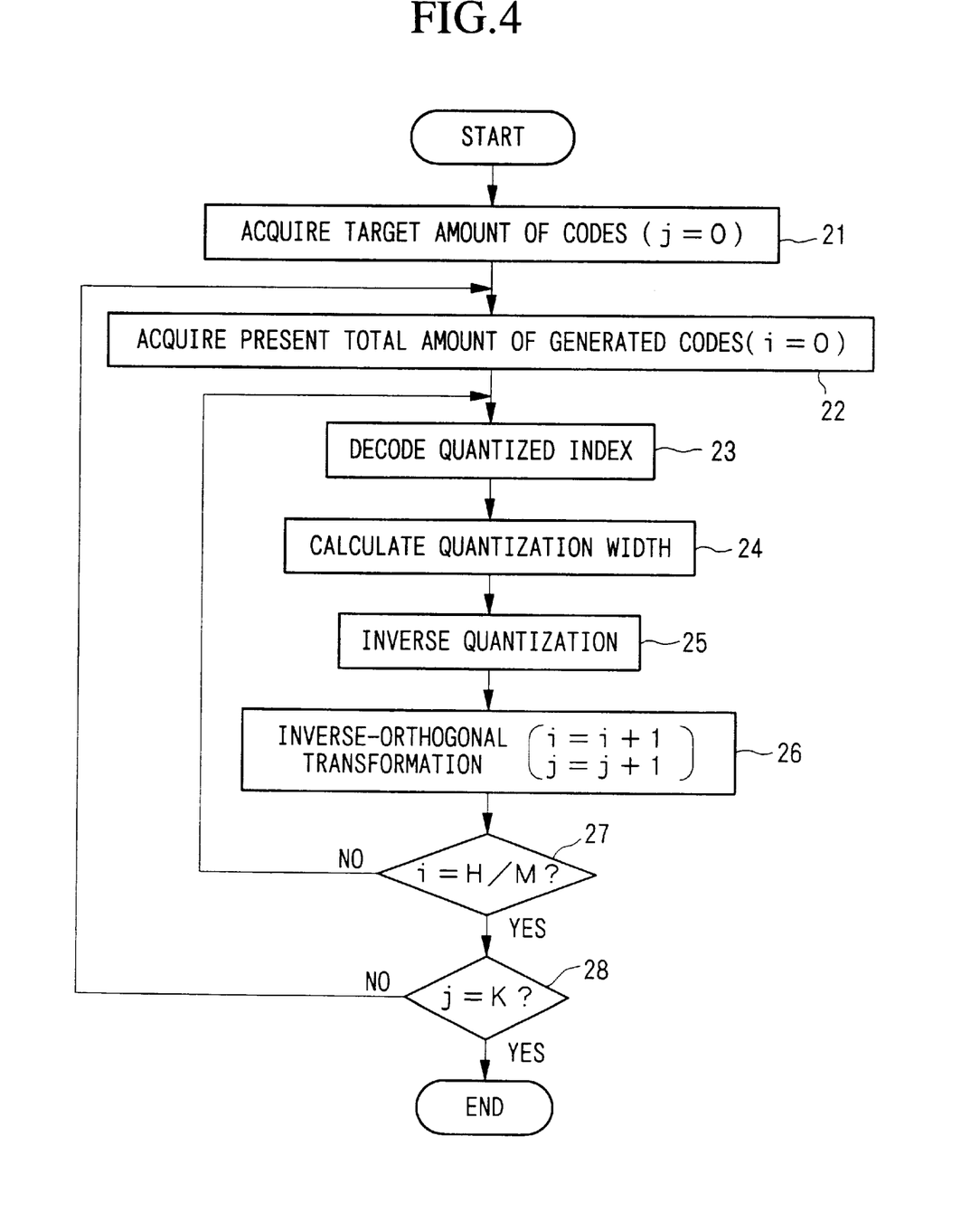
FIG. 4 is a flowchart showing the procedure of the decoding method as an embodiment according to the present invention.

FIG. 4 is a flowchart showing the procedure of the decoding method of the present embodiment.
1. The target amount $T_f$ of generated codes is extracted from the sequence of the encoded data (step 21).
2. The total amount $G_t$ of generated codes at the present time is extracted from the sequence of the encoded data (step 22). This operation corresponds to transmission of the total amount $G_t$ of generated codes in the encoding operations (see step 13 in FIG. 3), and is performed in quantization width calculating information extracting section 650. The extracted result is supplied to the quantization width calculating section 750. As described above, if transmission of $G_t$ is unnecessary, these operations are also unnecessary.
3. The quantized index of the coefficient of the orthogonal transformation of the small block to be decoded is decoded (step 23).
4. The quantization width $Q_k$ of the small block to be decoded is calculated (step 24).
5. The coefficient of the orthogonal transformation of the small block to be decoded is inverse-quantized using quantization width $Q_k$ (step 25).
6. The inverse-orthogonal transformation is performed on the small block to be decoded (step 26).
7. Operations of the above items 3–6 are repeatedly performed until H/M units of small blocks have been decoded (step 27).
8. Operations of the above items 2–7 are repeatedly performed until all small blocks in the target frame to be decoded have been decoded (step 28).

Operations of calculating the quantization width in the decoding method of the present embodiment will be explained below.

Here, the amount of generated codes of the small block is $G_i$ (i=0, 1, 2, ..., k-1), and the total amount of generated codes of small blocks up to the mth small block (that is, an amount of relevant decoded data which have already been received) is $G_t$. The assigned target amount $T_k$ of codes of the kth (k>m) small block is represented by the following formula.

$$T_k = \frac{T_f - G_{oh} - \sum_{i=m}^{k-1} G_i - G_t}{K - k} \quad (4)$$

Here, the assigned target amount $T_0$ of codes of the kth (k=m+1) block is as follows.

$$T_o = \frac{T_f - G_{oh} - G_t}{K} \quad (5)$$

The quantization width $Q_k$ of the small block to be decoded is determined based on the assigned target amount $T_k$ of codes of the small block to be decoded, according to the following formula.

$$Q_k = \frac{a \cdot (T_f - G_{oh})}{T_k \cdot K} \quad (6)$$

Here, "a" is the same predetermined constant as that used in the encoding operations.

In the present embodiment, a coding example of one frame of the digital picture signal is explained. However, the present invention may also be applied to digital moving picture signals and digital sound signals. Any control method of quantization may be used unless the method at the encoding side differs from the method at the decoding side. As information for calculating the quantization width, the total amount $G_t$ of generated codes at the time of starting the encoding is used in the present embodiment. However, any information, based on which the quantization width can be calculated, may be used. In addition, such information for calculating the quantization width depends on the used control method for quantization. Furthermore, the information for calculating the quantization width is sent for every H/M small blocks in the above embodiment; however, any period or interval may be adopted.

As described above, $G_t$ is used so that decoding is stably performed even if transmission loss is possible, and the amount $G_t$ is transmitted at a specified interval in the above embodiment. However, if there is no possibility of transmission loss, $G_t$ is unnecessary.

What is claimed is:

1. A digital signal encoding and decoding method wherein the encoding side comprises the steps of:

dividing a digital signal into small blocks;

calculating a quantization width for each small block to be encoded based on an amount of encoded data of a small block which has already been encoded;

quantizing the digital signal of each small block to be encoded, obtained by the division into small blocks, by using the calculated quantization width; and generating encoded data of each small block to be encoded according to a quantized index which is a digital signal after the quantization, and the decoding side comprises the steps of:

decoding the quantized index according to received encoded data of each small block to be decoded;

calculating a quantization width for each small block to be decoded based on an amount of encoded data which have already been received before the encoded data of the small block to be decoded is received;

inversely quantizing the quantized index for each small block, which is a digital signal after the decoding, by using the calculated quantization width; and regenerating a digital signal by combining the divided small blocks, and wherein the generated encoded data does not include information used for calculating the quantization width of the relevant small block and information on the quantization width.

2. A digital signal encoding and decoding method as claimed in claim 1, wherein:

the encoding side further comprises the step of including information which was used for calculating the quantization width into the generated encoded data at predetermined intervals of a plurality of small blocks; and the decoding side further comprises the step of extracting the information which was used for calculating the quantization width and which is included at the predetermined intervals from the encoded data, and the decoding side calculates the quantization width based also on this information.

3. A digital signal encoding method comprising the steps of:

dividing a digital signal into small blocks;

calculating a quantization width for each small block to be encoded based on an amount of encoded data of a small block which has already been encoded;

quantizing the digital signal of each small block to be encoded, obtained by the division into small blocks, by using the calculated quantization width; and generating encoded data of each small block to be encoded according to a quantized index which is a digital signal after the quantization, and wherein the generated encoded data does not include information used for calculating the quantization width of the relevant small block and information on the quantization width.

4. A digital signal encoding method as claimed in claim 3, further comprising the step of including information which was used for calculating the quantization width into the generated encoded data at predetermined intervals of a plurality of small blocks.

5. A computer readable storage medium storing a program for making a computer execute a digital signal encoding operation, the program comprising the steps of:

dividing a digital signal into small blocks;

calculating a quantization width for each small block to be encoded based on an amount of decoded data of a small block which has already been encoded;

quantizing the digital signal of each small block to be encoded obtained by the division into small blocks, by using the calculated quantization width; and generating encoded data of each small block to be encoded according to a quantized index which is a digital signal after the quantization, and wherein the generated encoded data does not include information used for calculating the quantization width of the relevant small block and information on the quantization width.

6. A computer readable storage medium as claimed in claim 5, wherein the program further comprises the step of including information which was used for calculating the quantization width into the generated encoded data at predetermined intervals of a plurality of small blocks.

7. A digital signal decoding method comprising the steps of:

decoding a quantized index according to received decoded data of each small block to be decoded;

calculating a quantization width for each small block to be decoded based on an amount of encoded data which have already been received, before the encoded data of the small block to be decoded is received;

inversely quantizing the quantized index for each small block, which is a digital signal after the decoding, by using the calculated quantization width; and regenerating a digital signal by combining divided small blocks.

8. A digital signal decoding method as claimed in claim 7, further comprising the step of extracting information which was used for calculating a quantization width at the time of encoding and which is included at predetermined intervals of a plurality of small blocks from the encoded data, and the step of calculating a quantization width is performed based also on this information.

9. A computer readable storage medium storing a program for making a computer execute a digital signal decoding operation, the program comprising the steps of:

decoding a quantized index according to received encoded data of each small block to be decoded;

calculating a quantization width for each small block to be decoded based on an amount of encoded data which have already been received before the encoded data of the small block to be decoded is received;

inversely quantizing the quantized index for each small block, which is a digital signal after the decoding, by using the calculated quantization width; and regenerating a digital signal by combining divided small blocks.

10. A computer readable storage medium as claimed in claim 9, wherein the program further comprises the step of extracting information which was used for calculating a quantization width at the time of encoding and which is included at predetermined intervals of a plurality of small blocks from the encoded data, and the step of calculating a quantization width is performed based also on this information.

11. A digital signal encoding apparatus comprising:

a small block division section for dividing a digital signal into small blocks;

a quantization width calculating section for calculating a quantization width for each small block to be encoded based on an amount of encoded data of a small block which has already been encoded;

a quantizer for quantizing the digital signal of each small block to be encoded, obtained by the division into small blocks, by using the calculated quantization width; and an encoded data generating section for generating encoded data of each small block to be encoded, according to a quantized index which is a digital signal after the quantization, and wherein the generated encoded data does not include information used for calculating the quantization width of the relevant small block and information on the guantization width.

12. A digital signal encoding apparatus as claimed in claim 11, further comprising a quantization width calculating information output section for including information which was used for calculating the quantization width into the generated encoded data at predetermined intervals of a plurality of small blocks.

13. A digital signal decoding apparatus comprising:

a decoding section for decoding a quantized index according to received encoded data of each small block to be decoded;

a quantization width calculating section for calculating a quantization width for each small block based on an amount of encoded data which have already been received before the encoded data of the small block to be decoded is received;

an inverse quantizer for inversely quantizing the quantized index for each small block, which is a digital signal after the decoding, by using the calculated quantization width; and a small block combining section for regenerating a digital signal by combining divided small blocks.

14. A digital signal decoding apparatus as claimed in claim 13, further comprising a quantization width calculating information extracting section for extracting information which was used for calculating a quantization width at the time of encoding and which is included at predetermined intervals of a plurality of small blocks from the encoded data, and wherein the quantization width calculating section calculates a quantization width based also on this information.

* * * * *